G. E. CHATILLON.
INDEX DEVICE.
APPLICATION FILED JULY 22, 1909.
1,028,540.
Patented June 4, 1912.
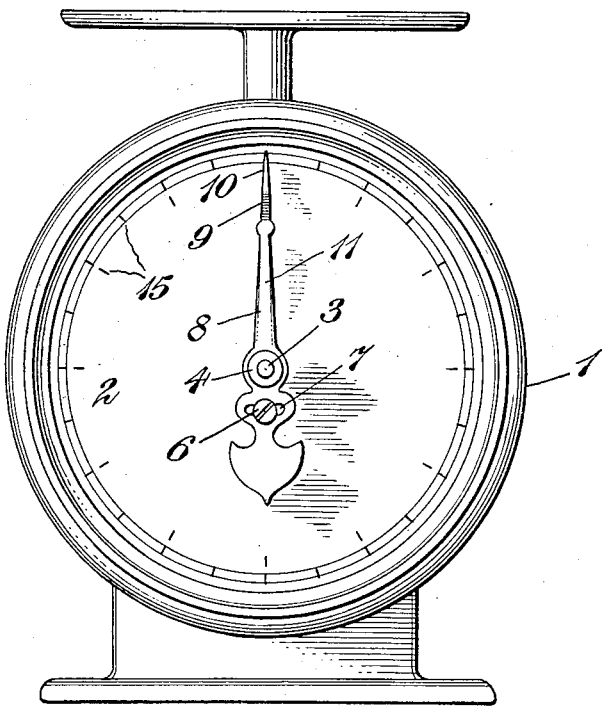
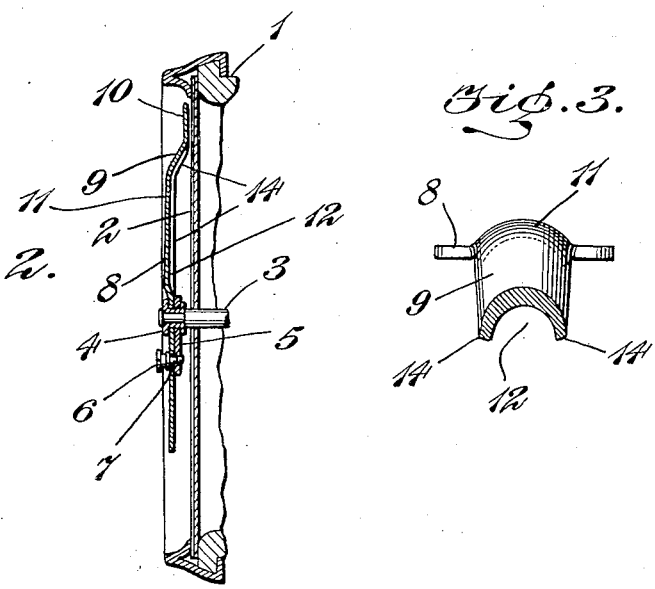
WITNESSES
INVENTOR
George E. Chatillon
BY
ATTORNEY

UNITED STATES PATENT OFFICE.

GEORGE E. CHATILLON, OF NEW YORK, N. Y.

INDEX DEVICE.

1,028,540.  Specification of Letters Patent.  Patented June 4, 1912.

Application filed July 22, 1909. Serial No. 508,898.

*To all whom it may concern:*

Be it known that I, GEORGE E. CHATILLON, a citizen of the United States, and a resident of the city, county, and State of New York, have invented certain Improvements in Index Devices, of which the following is a specification.

This invention relates to certain improvements in index devices, and more particularly in that class of such devices which are particularly designed and adapted for use in connection with dynamometers, weighing scales, and the like, and the object of the invention is to provide a device of this general character of a simple and comparatively inexpensive nature, having a novel and improved formation and arrangement of index member capable of operation to facilitate the reading of the graduations over which such index member plays.

The invention consists in certain novel features of the construction and arrangement of the improved index device, whereby the index member thereof is strengthened and is caused to conform more closely to the dial or other member bearing the graduated scale, so as to permit convenient and accurate reading of said scale, all as will be more fully hereinafter set forth.

The novel features of the invention will be carefully defined in the claim.

In order that my invention may be the better understood, I will now proceed to describe the same with reference to the accompanying drawings, wherein—

Figure 1 is an elevation of a weighing scale provided with an index device embodying my improvements; Fig. 2 is a sectional view taken through the indicating means and illustrating certain features of construction to be hereinafter referred to, and Fig. 3 is an enlarged sectional detail view showing the manner of strengthening the index member or pointer.

In these views 1 represents the casing of a weighing scale or the like to which I have illustrated my invention applied for use, and 2 represents the dial thereof, herein shown made in circular form with graduations of the ordinary kind extended in a curved series around its circumference, while 3 represents a shaft mounted for turning movement and positioned at the central part of said dial 2 and adapted to be driven from the weighing mechanism to actuate the index mechanism in order that the weight may be shown upon said dial. 4 represents a thimble applied upon the outer extremity of said actuating shaft 3, and provided with an arm or projection 5, extended at substantially right angles from said shaft and parallel with the outer surface of the dial 2, and adapted to be turned around said dial in unison with the movement of the shaft during the weighing operation, and 6 represents a screw carried upon the free end of said arm or projection 5 and having its shank portion passed through a slotted opening 7 produced in the butt end of an index member or pointer 8, the central part of which is mounted to turn upon the thimble 4. The head of said screw 6 is adapted for clamping engagement upon the outer surface of the index member or pointer 8, so as to permit of clamping said index member or pointer securely to said arm or projection 5 in such a manner as to effectively prevent turning of the index member or pointer upon the thimble 4, and compel said pointer to traverse the dial 2 in unison with the movement of the actuating shaft during the weighing operation, but when said screw 6 is loosened, the index member or pointer 8 may be turned about shaft 3 within the limits imposed by slot 7, so as to permit convenient correction or re-setting of the pointer to zero upon the dial.

The index member or pointer 8 is formed from an elongated piece or strip of flattened or sheet metal and its end opposite that wherein the slotted opening 7 is formed is made of greater length, and as shown herein, is tapered from the thimble 4 toward its free extremity, and in the manufacture of the improved indicating device the flattened metal of the pointer at such longer end thereof is made rounded upon its outer surface, as indicated at 11, such rounded surface being produced, as shown herein, by forming up the central portion of the flattened or sheet material from which said pointer is produced, so that a central groove or corrugation 12 is provided extended longitudinally along the rear or inner surface of said pointer, which in the assembled structure is next adjacent to the dial 2. The formation of this central longitudinal groove or channel 12 extended along the rear or inner surface of the index member or pointer 8 also serves to produce flanges or ribs 14, 14, substantially parallel with each other and extended lengthwise along the opposite edges of said longer end of the pointer, whereby the strength and stiffness of said pointer is very materially increased, so that the same may be formed from comparatively light or thin metal without liability of being too readily bent or broken during use.

15 represents the graduated scale upon the dial 2, and between said graduated scale and the shaft 3, the longer end or arm of the index member or pointer 8 is provided with a rearwardly bent or inclined portion 9, integrally produced in the length of said longer end of said pointer and extended from the main or body portion of the pointer toward the surface of the dial 2, and beyond said inclined rearwardly directed portion 9 the extremity 10 of said longer end or arm of the pointer or index member is extended parallel with the outer surface of the dial 2, so as to be adapted to traverse a path parallel with and closely adjacent to the graduated scale 15 of said dial during the weighing operation.

The longitudinal groove or channel 12 is terminated at the junction of the angular or bent connecting portion 9 with the straight terminal portion or extremity 10 of the index member or pointer whereby it will be seen that the straight terminal portion 10 retains the original flattened form of the sheet material from which the index member is produced and is thereby adapted to play in extremely close proximity to the surface of the dial and to present its straight flattened edge portions in close relation to the graduations thereof so as to greatly facilitate accurate reading of the dial indications.

The length of the straight flattened terminal portion 10 of the longer end or arm of the index member or pointer 8 is such as to permit of being extended entirely across the full width of the graduated scale 15 of the dial, and by this construction, and further by the arrangement of said straight terminal portion in close proximity to said graduated scale 15, the graduations and indices of the scale may be conveniently and accurately read in conjunction with the straight flattened edge surfaces of said terminal portion, even when viewed at a considerable angle to the surface of the dial, while the body portion of the index member or pointer 8 whereat connection is effected with the thimble 4 is positioned at a sufficient distance from the surface of the dial to prevent binding of the thimble or its arm 6 upon the dial. The invention is not, of course, limited to the employment of the specific means herein shown for effecting correction of the reading of the index or pointer 8 with respect to the scale 15 of the dial, but it is very desirable that the central or body portion of the pointer be spaced from the outer surface of the dial at such a distance as will permit the interposition of some such means and avoid engagement of said pointer upon the surface of the dial, and it is also very desirable that the terminal portion of the pointer be brought in close proximity to the graduations of the dial and be extended parallel thereto in order that accuracy of indication may be assured when the dial is viewed at an angle.

Where the index member or pointer is provided with the flattened terminal portion 10 adapted to play in close proximity to the dial as herein shown for facilitating accurate reading of the dial graduations as above set forth the bent or inclined portion 9 which affords an integral connection between the terminal portion 10 closely adjacent to the dial, and the main or body portion of the pointer 8 which is further removed from the dial, would ordinarily be a point of weakness whereat the pointer would be liable to become so bent or deformed as to cause its terminal portion 10 to engage upon the surface of the dial, but where the longer end of arm of said pointer 8 is reinforced or strengthened against bending strains, as for example, by imparting thereto a curved or bent cross sectional form such as is shown in the drawings, and the reinforcing or strengthening means is extended not only along the main or body portion of the pointer, but also along the said inclined or bent connecting portion 9, to the junction of said connecting portion with the flattened terminal portion 10, as heretofore set forth, the liability of such bending or deformation of the index member or pointer, even when made from comparatively thin material, is reduced to a minimum.

If desired, the dial 2 may be provided with a plurality of the graduated scales 15, and in the accompanying drawings, I have shown such dial provided with two such graduated scales, parallel with each other and both adapted to be traversed by the straight terminal portion 10 of the pointer, and said terminal portion of the pointer lying closely adjacent to the surfaces of both scales, and being of sufficient length to extend transversely across both such scales, it will be seen that both scales may be read with greater convenience and accuracy than would be possible otherwise.

Having thus described my invention, what I claim and desire to secure by Letters Patent is—

An index device having a dial with graduations upon its surface, an actuating shaft, and a pointer carried by the shaft formed from flattened material and having a straight flattened and elongated portion closely adjacent to and parallel with the surface of the dial whereat the graduations are produced and adapted to traverse said graduations when the shaft is turned, said pointer being also provided with a main portion connected with the shaft and extended across the dial at a greater distance from its surface than said terminal portion and having a connecting portion extended at an angle to the surface of the dial and affording integral connection between said main and terminal portions of the pointer, and said pointer having a longitudinal corrugation extended lengthwise along its main portion and along said angular connecting portion to its junction with the flattened terminal portion and affording a reinforcement for said angular connecting portion.

In witness whereof I have hereunto signed my name, in the presence of two subscribing witnesses.

GEORGE E. CHATILLON.

Witnesses:
J. D. CAPLINGER,
A. F. CONNETT.

---

Copies of this patent may be obtained for five cents each, by addressing the "Commissioner of Patents, Washington, D. C."